(12) United States Patent
Mahieu

(10) Patent No.: US 8,939,405 B2
(45) Date of Patent: Jan. 27, 2015

(54) AIRCRAFT FUSELAGE ELEMENT

(75) Inventor: Benjamin Mahieu, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 478 days.

(21) Appl. No.: 13/000,952

(22) PCT Filed: Jun. 19, 2009

(86) PCT No.: PCT/FR2009/051172
§ 371 (c)(1),
(2), (4) Date: Apr. 7, 2011

(87) PCT Pub. No.: WO2010/004157
PCT Pub. Date: Jan. 14, 2010

(65) Prior Publication Data
US 2011/0180665 A1    Jul. 28, 2011

(30) Foreign Application Priority Data
Jun. 26, 2008 (FR) .................................... 08 54266

(51) Int. Cl.
*B64C 1/00*   (2006.01)
*B64C 1/06*   (2006.01)
*B29D 99/00*  (2010.01)

(52) U.S. Cl.
CPC .............. *B64C 1/061* (2013.01); *B29D 99/001* (2013.01); *B64C 1/068* (2013.01); *B64C 2001/0072* (2013.01); *Y02T 50/433* (2013.01); *Y02T 50/43* (2013.01)
USPC ......................................... 244/120; 244/119

(58) Field of Classification Search
CPC .. B64C 1/12; B64C 2001/0081; B64C 1/061; B64C 1/069

USPC .......................................... 244/119, 120, 131
See application file for complete search history.

(56) References Cited

U.S. PATENT DOCUMENTS

| | | | | |
|---|---|---|---|---|
| 2,420,292 A | * | 5/1947 | Baer et al. ........................ | 52/561 |
| 2,615,234 A | * | 10/1952 | Dumbleton ...................... | 29/462 |
| 4,531,695 A | * | 7/1985 | Swinfield ....................... | 244/119 |

FOREIGN PATENT DOCUMENTS

| | | |
|---|---|---|
| DE | 915 063 | 7/1954 |
| FR | 808 710 | 2/1937 |
| FR | 880 181 | 3/1943 |
| GB | 759 529 | 10/1956 |
| GB | 2 196 922 | 5/1988 |

OTHER PUBLICATIONS

International Search Report Issued Jan. 14, 2010 in PCT/FR09/051172 filed Jun. 19, 2009.

* cited by examiner

*Primary Examiner* — Rob Swiatek
*Assistant Examiner* — Timothy Schwarz
(74) *Attorney, Agent, or Firm* — Oblon, Spivak, McClelland, Maier & Neustadt, L.L.P.

(57) ABSTRACT

An aircraft fuselage element being a one-piece component, and including a closed wall defining an internal volume, an external surface of the wall forming the external skin of the fuselage. The wall has a cross section that includes on a side facing the internal volume a planar central part, a male connecting element at a first edge, and a female connecting element at its other edge, which connecting elements project, each connecting element configured to engage with the corresponding connecting element of another fuselage element placed side by side with the fuselage element to connect these fuselage elements longitudinally to each other, and one of the connecting elements includes a step forming a frame for the fuselage.

10 Claims, 3 Drawing Sheets

AIRCRAFT FUSELAGE ELEMENT

CROSS-REFERENCE TO RELATED APPLICATIONS

This application is based upon and claims priority under 35 U.S.C. §119 from French Patent Application No. 0854266, filed Mar. 26, 2008 and under 35 U.S.C. §371 from International Patent Application No. PCT/FR2009/051172, filed Jun. 19, 2009.

BACKGROUND OF THE INVENTION

Field of the Invention

This invention belongs to the field of aeronautics and in particular of aircraft fuselages. More precisely, the invention relates to an aircraft fuselage element all in one piece made of composite material.

The fuselage constitutes the body of the aircraft on which the wing group, the landing gears and the stabilization components in particular are mounted.

A fuselage typically is a hollow body made of metal panels mounted and fastened on a metal framework. Once riveted, the metals panels form the external skin of the aircraft.

Now, it is known that manufacturing defects prevent the achievement of a smooth and sealed external surface of the fuselage, which generates the manifestation of an aerodynamic drag when the airplane is in flight. These defects result in particular from the assembly tolerances of these panels for forming the external skin of the airplane. In particular, the existence of a non-alignment between adjacent panels will be cited, purely as an example.

Furthermore, since the fuselage is entirely of metal, it has the drawback of being heavy.

This results in an over-consumption of aviation fuel which is contrary not only to the economic interests of the companies operating this type of aircraft, but also to environmental requirements.

The aeronautical manufacturers therefore have attempted to lighten the weight of the fuselage by replacing certain metal parts with elements made of composite materials.

By way of example, these composite materials are used in the manufacture of the center-line fairing of the airplane.

Recourse to composite materials in the manufacture of an aircraft, however, and in particular of its structural parts, still is too limited.

The use of these materials furthermore is reserved for the manufacture of simple parts. In the case of an external skin section, it therefore is necessary then to undertake the installation and fastening of groups of parts or of individual parts in order to form the internal framework or even the window frames, for example.

The manufacture of all these elements, then their assembly, are long and costly.

Finally, this assembly weakens the general structure of the aircraft and may be the source of incidents linked to human errors.

SUMMARY OF THE INVENTION

The purpose of this invention therefore is to propose an aircraft fuselage element that is simple in its design and in its mode of operation, this fuselage element being all in one piece and directly integrating a frame and possibly a cross-piece, a window frame, or even a gear compartment portion.

To this end, the invention relates to an aircraft fuselage element. According to the invention,
- since this fuselage element is all in one piece, it comprises a closed wall defining an internal space, the external surface of this wall forming the external skin of the fuselage,
- the wall has a cross section comprising, on the internal-space side, a flat median part, a male connecting element at a first end and a female connecting element at its other end, the said connecting elements being positioned projecting, each of these connecting elements being intended to cooperate with the corresponding connecting element of another fuselage element positioned edge-to-edge with this fuselage element with a view to interlocking these fuselage elements longitudinally with each other,
- one of the connecting elements comprises a step forming a frame for the fuselage.

Since the fuselage element achieved in this way is all in one piece and obtained by casting, the external surface of this element is perfectly smooth and does not generate any aerodynamic drag. A sole female mold advantageously suffices for the manufacture of all the fuselage elements with constant section.

The fuselage element is not necessarily cylindrical and may have any other form such as oval or ovoid.

Moreover, problems linked to assembly are precluded since the fuselage element is functionalized at the time of its manufacture and directly integrates a frame and more generally transverse framework elements appearing periodically at each inter-frame, that is to say in a space between two successive frames.

There is understood by "all in one piece" that the fuselage element is in a single part, and consequently does not result from an assembly of a plurality of initially separate parts.

There is understood by "longitudinally interlocking" positioning the fuselage elements edge-to-edge with a view to engaging them through cooperation of the male and female connecting elements thus positioned facing, and assembling them to form an aircraft fuselage section.

There is understood by "corresponding connecting element" that when the connecting element of a first fuselage element is a male, or conversely female, connecting element, the connecting element of the second fuselage element positioned edge-to-edge with this first fuselage element with a view to assembly thereof is a female, or conversely male, connecting element. In different specific embodiments of this aircraft fuselage element, each having its special advantages and capable of numerous possible technical combinations:
- since this element is made of composite material, the male and female connecting elements are continuous or non-continuous over the entire circumference of the closed wall, The connecting elements may be continuous, that is to say that they are positioned projecting in relation to the median part of the wall over the entire periphery of the internal-space side of the closed wall. Alternatively, they may not be continuous and thus form islands of additional thickness.
- since the female connecting element comprises a staggering of the wall in relation to its median part, the male connecting element is an additional thickness intended to be accommodated at least partially in this staggering.

There is understood by "staggering of the wall in relation to its median part" that the external surface of the wall in this place is offset on the internal-space side in relation to the external surface of the wall in its median part. Purely by way of example, this staggering may be linked to the median part so as to form a clear step, that is to say that the staggering is linked to this median part by a wall portion perpendicular or more or less perpendicular to the plane passing through the median part.

this staggering is linked to the median part by a dislevelment intended to compensate for the difference in height between this staggering and the median part.

This dislevelment may be achieved, for example, by placing dead folds, made of resin or a low-density material.

the fuselage element comprises stringer portions positioned at least on the median part of the wall.

These stringer portions are distributed evenly or otherwise over the entire circumference of the closed wall on the internal-space side.

The invention also relates to an aircraft fuselage. According to the invention, the fuselage comprises fuselage elements such as described above, which are interlocked longitudinally with each other.

The longitudinal axes of these fuselage elements are at nearly the same assembly tolerances and form the longitudinal axis of the fuselage.

Assembly of the fuselage elements is accomplished by gluing, riveting or even co-baking.

Finally, the invention relates to an aircraft equipped with at least one fuselage element such as described above.

BRIEF DESCRIPTION OF THE DRAWINGS

The invention will be described in greater detail with reference to the attached drawings in which.

DETAILED DESCRIPTION OF THE INVENTION

Figure 1:
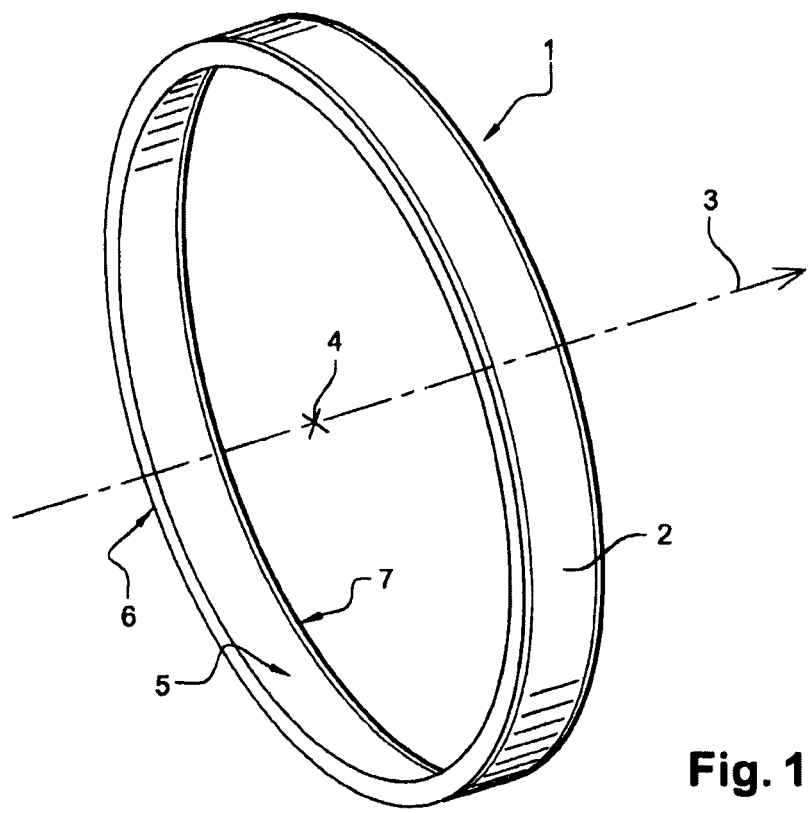
FIG. 1 is a perspective view of a fuselage element according to a first embodiment of the invention.
Figure 2:
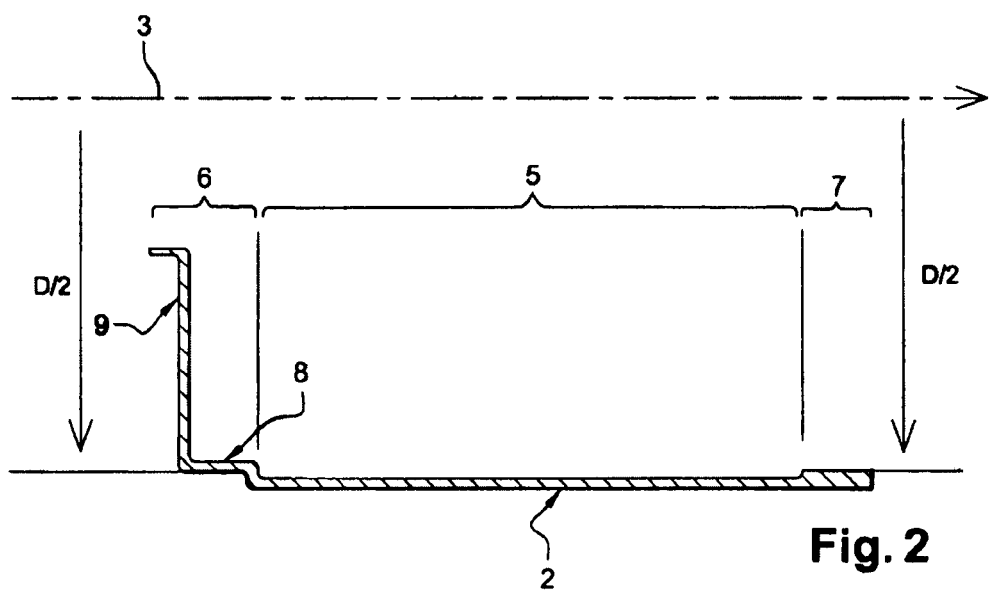
FIG. 2 is a sectional view of the fuselage element of FIG. 1 along the longitudinal axis of the fuselage element.

FIGS. 1 and 2 show a fuselage element according to a specific embodiment of the invention. This fuselage element which is all in one piece and cylindrical is made of composite material.

Since the section of the fuselage elements is constant and with diameter D, each fuselage element advantageously is produced with the aid of a single mold in which dry fiber preforms are disposed. A resin then is injected and the whole is polymerized by baking so that these preforms create a composite material following the internal shape of the mold.

Each fuselage element comprises a closed wall 1 defining an internal space. This closed wall 1 consequently defines an external surface 2 over 360° which, taking advantage of the condition of the mold surface, therefore may be smooth. This external surface 2 is intended to form the external skin of the aircraft fuselage.

On FIG. 2 there is shown a sectional view of this wall 1 along the longitudinal, or main, axis 3 of the fuselage element, this main axis 3 passing at its center 4. This section comprises, on the internal-space side, a flat median part 5, a female connecting element 6 at one of its ends and a male connecting element 7 at its other end. These connecting elements 6, 7 are positioned projecting in relation to flat median part 5.

Each connecting element 6, 7 of this fuselage element is intended to cooperate with the corresponding connecting element of another fuselage element positioned edge-to-edge with same, with a view to interlocking these fuselage elements longitudinally with each other. Thus since two fuselage elements are positioned edge-to-edge with a view to their assembly, the female connecting element 6 cooperates with the male connecting element 7 to ensure the engagement of these fuselage elements.

The assembly by engagement of two fuselage elements therefore is accomplished on the internal-space side. That advantageously makes it possible to optimize each fuselage element according to the stresses associated with the aircraft fuselage zone where it is intended to be positioned.

Female connecting element 6 here comprises a staggering 8 intended to accommodate male connecting element 7 and a step 9 forming a frame for the fuselage. Staggering 8 of the wall in relation to its flat median part 5 is positioned between this median part 5 and step 9 forming a frame. Step 9 forming a frame therefore also is offset in relation to median part 5.

Staggering 8 constitutes a second step with height considerably less than the height of step 9 forming a frame. Since the mold for producing these fuselage elements is a single one, second step 8 is of constant height. Male connecting element 7 therefore is an additional thickness of constant height, as shown on FIG. 2, so that this additional thickness covers the skin thicknesses of all the fuselage elements assembled in this way, as regards these skin thicknesses, their being able to vary from one fuselage element to another. This additional thickness makes it possible to ensure precision fitting at the engagement.

Connecting elements 6, 7 are continuous over the entire circumference of closed wall 1.

Figure 3:
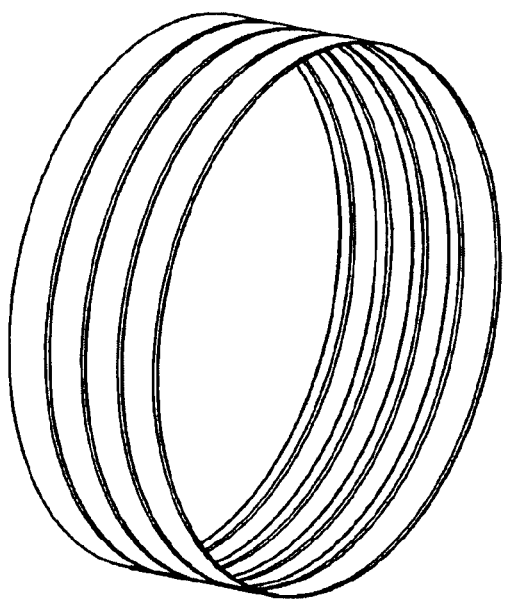
FIG. 3 schematically shows a set of fuselage elements of FIG. 1 assembled with each other longitudinally to form an aircraft fuselage section with constant section.
Figure 4:
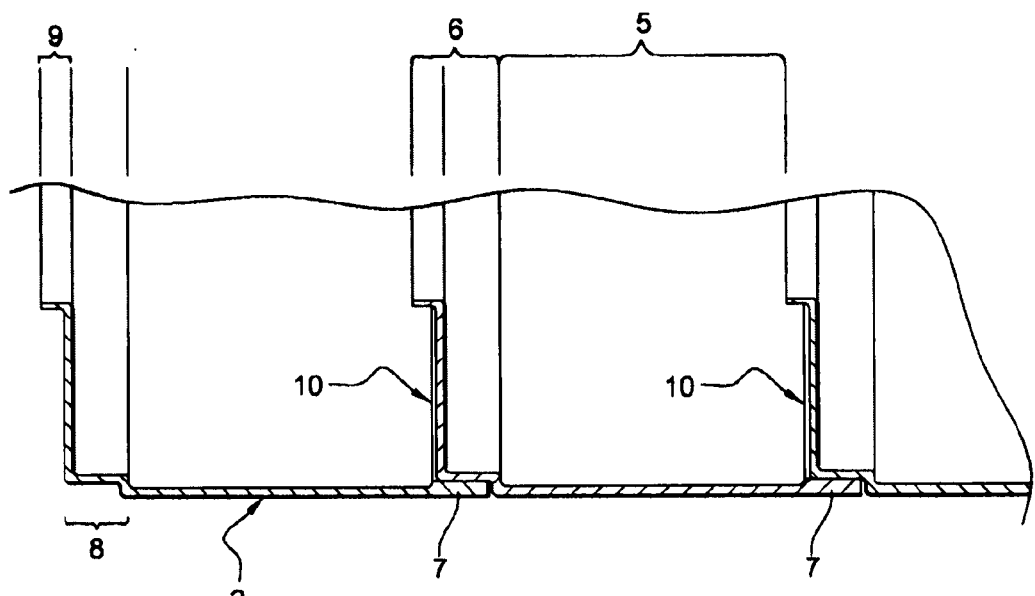
FIG. 4 is a sectional view of the fuselage section of FIG. 3.

FIGS. 3 and 4 show a set of fuselage elements assembled with each other to form a fuselage section. These fuselage elements are interlocked by gluing, riveting or co-baking. A sealing joint 10 moreover is disposed in order to ensure the imperviousness of each joining of connecting elements 6, 7 of two successive fuselage elements assembled in this way.

Since the upper part of staggering 8 is straight and horizontal, and positioned between step 9 forming a frame for the fuselage and flat median part 5, it is interlocked with a crosspiece (not shown). In this way the floor crosspiece forms an integral part of the fuselage element and it is taken up directly on flanged edge 9, or step, forming a frame.

Figure 5:
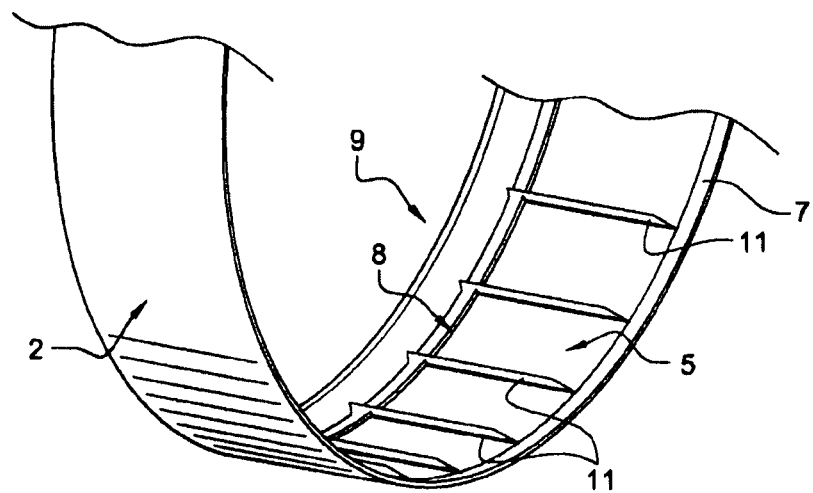
FIG. 5 is an enlarged perspective view of a fuselage element according to a second embodiment of the invention.

FIG. 5 is an enlarged perspective view of a fuselage element according to a second embodiment of the invention. The elements of FIG. 5 bearing the same references as the elements of FIGS. 1 to 4 show the same objects. They therefore will not be described again. This fuselage element differs in that it integrates stringer portions 11. These stringer portions 11 extend over median part 5 and over staggering 8.

In this way the assembly operations at circumferential joinings are limited, which is less costly. The wall, however, must transfer the stresses in full to the joining between two fuselage elements.

Figure 6:
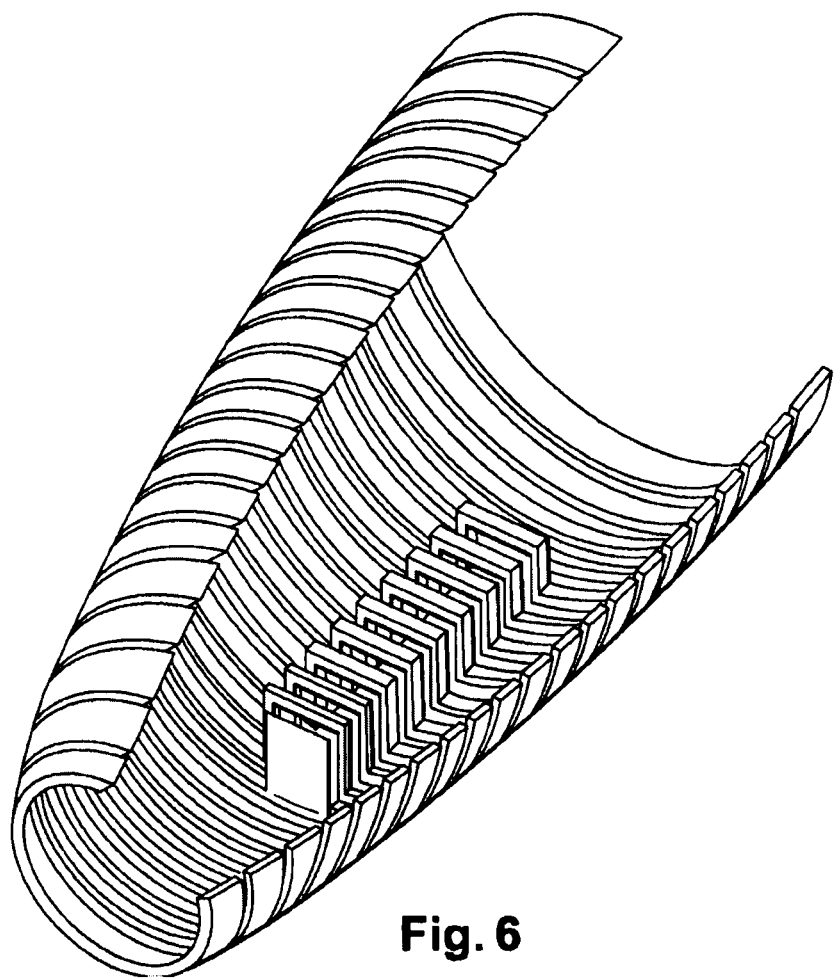
FIG. 6 is an exploded perspective view of a nose cone made from fuselage elements according to a third embodiment of the invention.

FIG. 6 is an exploded perspective view of a nose cone produced from fuselage elements according to a third embodiment of the invention. Some of these fuselage elements each integrate a gear compartment portion with its additional bearing reinforcements so that after assembly of these elements, the nose cone directly comprises the gear compartment.

The invention claimed is:

1. An aircraft fuselage element, in which the fuselage element is in one piece and has a longitudinal axis, comprising:
a closed wall defining an internal space, an external surface of the closed wall forming an external skin of a fuselage, the closed wall having a cross section along the longitudinal axis comprising, on an internal-space side, a flat median part which is parallel to the longitudinal axis, a male connecting element at a first end of the flat median part and which has a thickness greater than a thickness of the flat median part, and a female connecting element at an other end of the flat median part, the connecting elements being positioned projecting in the internal space, each of the connecting elements configured to cooperate with a corresponding respective connecting element of another fuselage element positioned edge-to-edge with the fuselage element with a view to interlocking these fuselage elements longitudinally with each other, the female connecting element including a staggering of the closed wall in relation to the flat median part, and the male connecting element is configured to be accommodated at least partially in an other staggering having a form of the staggering of the female connecting element, and
one of the connecting elements comprises a step forming a frame for the fuselage, at least a part of the one of the connecting elements being located between the step and the flat median part.

2. An element according to claim 1, wherein the fuselage element is made of composite material, and the male and female connecting elements are continuous or non-continuous over an entire circumference of the closed wall.

3. An element according to claim 1, wherein the staggering forms a second step in the internal space with height less than the step forming the frame for the fuselage.

4. An element according to claim 1, wherein the staggering is linked to the flat median part by a dislevelment configured to compensate for a difference in height between the staggering and the flat median part.

5. An element according to claim 1, wherein an upper part of the staggering is straight and horizontal, and positioned between the step forming the frame for the fuselage and the flat median part, it is interlocked with a crosspiece.

6. An element according to claim 1, further comprising an object chosen from the group of: a window frame, a gear compartment portion, a gear compartment portion with bearing reinforcements, and a gear compartment portion with bearing reinforcements and the bearing, the object being positioned projecting on the internal-space side.

7. An element according to claim 1, further comprising stringer portions positioned at least on the flat median part of the closed wall.

8. An aircraft fuselage, comprising fuselage elements according to claim 1, interlocked longitudinally with each other.

9. An aircraft comprising at least one fuselage element according to claim 1.

10. An element according to claim 1, wherein the female connecting element being located between the step and the flat median part.

* * * * *